E. METTLER.
BOILER TUBE CLEANER.
APPLICATION FILED MAY 15, 1908.
914,592.
Patented Mar. 9, 1909.
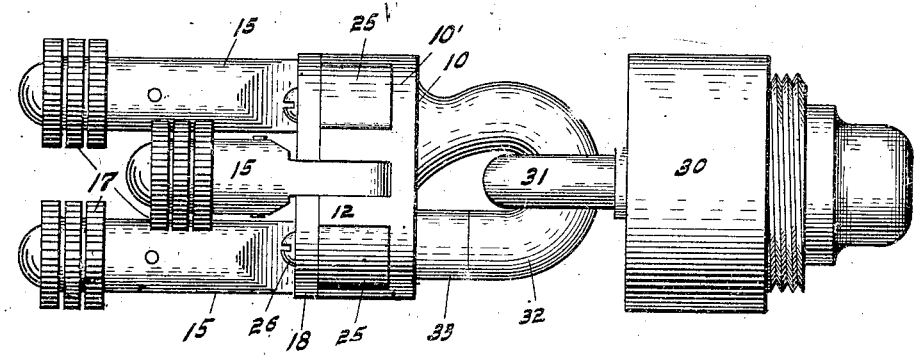
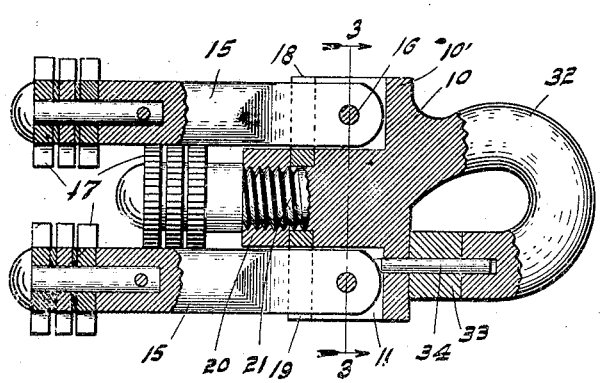
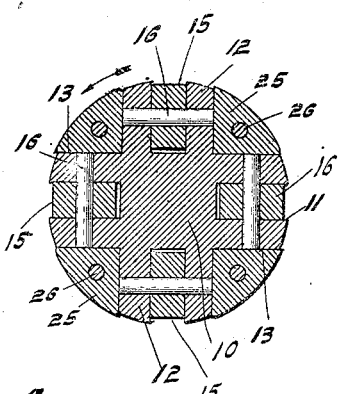
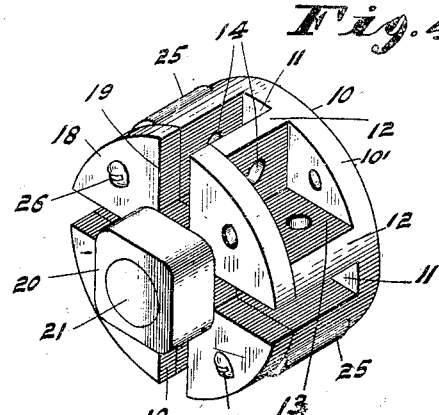
Witnesses
Frank A. Fahle
Thomas W. McMeans
Inventor
Eugene Mettler,
by Bradford Hood
Attorneys

UNITED STATES PATENT OFFICE.

EUGENE METTLER, OF INDIANAPOLIS, INDIANA.

BOILER-TUBE CLEANER.

No. 914,592.　　　Specification of Letters Patent.　　　Patented March 9, 1909.

Application filed May 15, 1908.　Serial No. 432,985.

*To all whom it may concern:*

Be it know that I, EUGENE METTLER, a citizen of the United States, residing at Indianapolis, in the county of Marion and State of Indiana, have invented certain new and useful Improvements in Boiler-Tube Cleaners, of which the following is a specification.

The object of my invention is to provide such improvements in detail of construction of a boiler tube cleaning tool as to increase its life and to facilitate the replacement of those parts which are especially subject to wear.

The accompanying drawings illustrate my invention.

Figure 1 is a side elevation of such a tool embodying my improvements, including a side elevation of an ordinary form of motor for driving the same; Fig. 2 an axial section in the plane of Fig. 1; Fig. 3, a section on line 3, 3 of Fig. 2, and Fig. 4 a perspective detail of the improved head with a portion of the members removed.

In the drawings 10 indicates the main body of the tool provided with a plurality of substantially radial sockets 11 defined by walls 12. By this arrangement there are formed between the walls 12 nearly triangular pockets 13 one of which is thus formed between each two sockets 11. The walls 12 are perforated by openings 14 substantially at right angles thereto and to the sockets 11 which intervene. Mounted in each of sockets 11 is the flattened inner end of a finger 15 pivotally supported in the socket 11 by means of a pin 16 each of which pins is passed freely through openings 14 and is of a length substantially equal to the distance between the outer faces of the two walls 12, as clearly shown in Fig. 3. The outer end of each finger 15 carries suitable cutting or cleaning members 17 which form no part of my present invention.

In the operation of the device the fingers 15 swing outwardly by centrifugal force and there will be considerable wear on the inner walls 12 unless some member were provided to take this wear. For this purpose I therefore provide a plate 18 having substantially radial notches 19 adapted to receive and fit the inner ends of the fingers 15 immediately adjacent the open ends of the sockets 11. The plate 18 is held in place by any suitable means such for instance as a nut 20 on a threaded stud 21 formed integrally with the body 10 and projected through the central opening in plate 18. Nut 20 is preferably of such size that it can not be turned upon its stud 21 until the fingers 15 have been removed from the body, said fingers thus serving to lock the nut in place. The rotation of the main body 10 within the boiler tube necessarily wears the circumference of said head quite rapidly unless some means is provided to take that wear, and for this purpose I mount in each substantially triangular socket 15 a hard metal block 25 which fills the pocket 13 and has an arc shaped exterior projecting slightly beyond the circumference of the body 10, as clearly shown in Fig. 3, each of said blocks being held in place by a readily removable screw 26 passing through plate 18 and into the rear flange 10' of the main body 10, the arrangement being such that the blocks 25 when in place serve to retain pins 16. In order to rotate the main body 10 an ordinary motor 30 may be used, said motor having as an active member an eye 31 adapted to receive a hook 32 carried by or formed integrally with main body 10. The point of hook 32 lies at a distance from the main body 10 an amount sufficient to permit the introduction of eye 31 and, in order to insure against sudden detachment of the parts I fill the gap with a perforated block 33 which is held in place by means of a pin 34 passed through flange 10' and into hook 32, the opening therefor being formed in the bottom of one of the sockets 11 so that, after pin 34 is in place, the corresponding finger 15 may be arranged in its socket 11 (as clearly shown at the bottom of Fig. 2) and serve to retain pin 34 in place. The blocks 25 may be sharpened on their forward edges so as to form final cleaning cutters if desired.

I claim as my invention:

1. In a tool of the class described, the combination of a main body having a plurality of sockets for receiving fingers and a plurality of alternating wearing block-pockets, of a finger mounted pivotally in each of said sockets, a pivot pin passing therethrough and through the walls of the sockets, wearing blocks mounted in the pockets and obstructing the said pivot pins, and means for removably holding said wearing blocks in place.

2. In a tool of the class described, the combination of a main body having a plurality of sockets, cleaning fingers pivotally mounted in each of said sockets, a wearing plate 18 having a plurality of notches each adapted to receive one of said cleaning fingers and supporting the same transversely, and means for detachably holding said plate 18 in place.

3. In a tool of the class described, the combination of a main body having a plurality of sockets, cleaning fingers pivotally mounted in each of said sockets, a wearing plate 18 having a plurality of notches each adapted to receive one of said cleaning fingers and supporting the same transversely, means for detachably holding said plate 18 in place, and a plurality of wearing blocks removably mounted in the circumference of the head and obstructing the withdrawal of the pivot pins of the cleaning fingers.

In witness whereof, I, have hereunto set my hand and seal at Indianapolis, Indiana, this twelfth day of May, A. D. one thousand nine hundred and eight.

EUGENE METTLER. [L. S.]

Witnesses:
ARTHUR M. HOOD,
THOMAS W. MCMEANS.